Patented Feb. 26, 1946

2,395,564

UNITED STATES PATENT OFFICE 2,395,564

PROCESS OF RECOVERING CARBON DIOXIDE FROM GASES

Frank Henderson May, Trona, Calif., assignor to American Potash & Chemical Corporation, Trona, Calif., a corporation of Delaware No Drawing. Application September 30, 1942, Serial No. 460,278

4 Claims. (Cl. 23—150)

This invention relates to a process of producing carbon dioxide from sources in which the carbon dioxide is present in admixture with other gases.

The ordinary method of recovering carbon dioxide from gases is to contact the gases with an absorbing medium, usually containing sodium carbonate in solution, and then boiling the absorbing medium to expel the absorbed carbon dioxide therefrom.

An object of the present invention is to provide a process of producing carbon dioxide from gases by which the amount of carbon dioxide which may be recovered from the gases per gallon of absorbing medium used may be made large without necessitating the employment of high partial pressures of carbon dioxide in contact with the absorbing medium. By means of the present invention, I have been able to recover as high as 0.5 or more pounds of carbon dioxide per gallon of absorbing medium used, whereas with usual practice only about 0.1 pound of carbon dioxide per gallon of absorbing medium may be recovered.

A further object of the present invention is to provide a process of recovering carbon dioxide from gases, by which process I am enabled to reduce the amount of water vapor released from the absorbing medium during the steps of boiling off the carbon dioxide therefrom. By means of the process of the present invention, I liberate only about one-fifth or less of the water vapor which is ordinarily liberated with carbon dioxide during the usual boiling off operations.

The process of the present invention involves two important discoveries. The first of these discoveries is that by maintaining in the absorbing medium a sufficient concentration of potassium and borate material so that potassium pentaborate will be liberated during the absorption of carbon dioxide, the acidity of the absorbing medium may be maintained at a sufficiently low value to permit absorption of greatly increased quantities of carbon dioxide without increasing the partial pressure of carbon dioxide over that occurring in usual practice.

At the start of the absorbing operations, the borate material is mainly present in the tetraborate form, i. e., with a ratio of $B_2O_3$ to $K_2O$ of 2 to 1. Throughout this description, I refer to such tetraborate as the "basic" constituent of the absorbing liquor, as it has a great affinity for the acidic gas, $CO_2$. During the absorbing operations, the tetraborate material is converted into pentaborate in accordance with the following equation:

$$5K_2B_4O_7.4H_2O + 6CO_2 = 2K_2B_{10}O_{16}.8H_2O + 6KHCO_3 + H_2O$$
(Precipitate)

In this description, I refer to the pentaborate ($K_2B_{10}O_{16}$) as the "acid" constituent; it has a ratio of $B_2O_3$ to $K_2O$ of 5 to 1, and is formed in the process of my invention by virtue of the added acidity provided by the absorbed carbon dioxide. According to the foregoing equation, there is formed a "sludge" of carbonated liquor and precipitated potassium pentaborate octohydrate, and it is the precipitation of this acidic constituent from the solution present which enables my process to proceed with such a large absorption of carbon dioxide per gallon of absorbing medium.

The second basic discovery of the present invention is that the liberation of carbon dioxide from the absorbing medium may be greatly facilitated by retaining the precipitated potassium pentaborate in contact with the solution containing the absorbed carbon dioxide during the operations of boiling off the carbon dioxide therefrom.

In accordance with the process of the present invention, the sludge of precipitated potassium pentaborate octohydrate and liquor is heated to boil off the absorbed carbon dioxide. During this operation, generally termed "desorption" in the art, the precipitated potassium pentaborate octohydrate goes back into solution, acidifying the solution and thereby materially aiding the liberation of the carbon dioxide. By the process of this invention, the carbon dioxide may be boiled off the absorbing medium while evaporating only one-fifth, or less, of the amount of water evaporated in usual practices.

The process of the present invention, together with additional discoveries and advantages of the invention, should be fully understood from the following description of a number of examples of processes embodying the invention.

Since the process is a cyclic process, the description of it may begin at any point in the cycle. I will describe the first example of a process embodying the present invention, commencing the description with a statement of the composition of the sludge constituting the absorbing medium obtained at the completion of the absorbing operation. Such a sludge as obtained at 35° C. contained 27.6 gm. of potassium pentaborate octohydrate ($K_2B_{10}O_{16}.8H_2O$) as a solid per 100 gm. of excess water in the accompanying solution. The accompanying solution had the following composition:

| | Grams |
|---|---|
| Potassium tetraborate tetrahydrate ($K_2B_4O_7.4H_2O$) | 31.0 |
| Potassium pentaborate octohydrate ($K_2B_{10}O_{16}.8H_2O$) | 4.3 |
| Potassium bicarbonate ($KHCO_3$) | 24.1 |
| Excess water ($H_2O$) | 100.0 |
| Total solution | 159.4 |

It should be understood that while the sludge of the foregoing composition is well adapted for use in the process of the present invention, sludges of other concentrations or densities may be employed. The presence of sodium compounds in the sludge is not deleterious to the process, as more particularly pointed out in connection with the third example.

In the process, such a sludge is heated to boil off the absorbed carbon dioxide ($CO_2$). Upon heating the sludge, when the temperature reaches about 65° C., a very rich carbon dioxide gas is first obtained. As the temperature of the material reaches 95° C., the amount of water vapor in the carbon dioxide liberated increases. In Example 1 I may continue the boiling off process until a temperature of 100° C. is reached. During this boiling off process, most, if not all, of the potassium pentaborate octohydrate becomes dissolved in the solution by the time the solution has been heated to about 65° C. Stated another way, the potassium pentaborate octohydrate is a material whose solubility increases very rapidly with rise in temperature. The return of this acidic constituent to the solution at the start of the boiling off operation very materially assists the evolution of the carbon dioxide and thereby reduces the amount of water vapor which it is necessary to drive off the solution in order to recover the absorbed carbon dioxide. By the time the temperature of the solution has reached 100° C., the potassium bicarbonate content of the solution has been reduced from the original value of 24.1 gm. to about 10 gm. More correctly stated, in the first example as described, the original 27.6 gm. of precipitated $K_2B_{10}O_{16}.8H_2O$ had completely reacted with the potassium bicarbonate ($KHCO_3$), in accordance with the following equation:

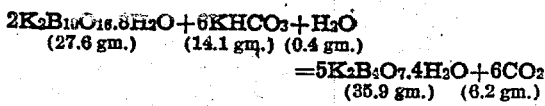

$2K_2B_{10}O_{16}.8H_2O + 6KHCO_3 + H_2O$
(27.6 gm.)   (14.1 gm.)   (0.4 gm.)
$= 5K_2B_4O_7.4H_2O + 6CO_2$
(35.9 gm.)   (6.2 gm.)

In boiling off carbon dioxide from absorber liquors, the cost of the product is largely determined by the quantity of water vapor that is evolved simultaneously with the carbon dioxide. Since the evolution of the concomitant but useless water vapor requires heat, it is obvious that the less water vapor liberated during desorption, the less the cost of the procedure. Such heat is generally supplied in the form of steam, and the demand for such steam in the desorption operation is generally spoken of as the steam consumption or the heat requirements of the process. In plant practice, the provision of economizers, heat exchangers, and counter-current towers affect the total quantity of steam required to some extent, but the amount of water vapor which is liberated with the carbon dioxide nevertheless largely determines the steam or heat requirements of the process. Accordingly, I find an important factor to be considered in evaluating such a process is to determine the ratio of water vapor to carbon dioxide liberated in the process. The ratio of water vapor to carbon dioxide which will be liberated in the process may be affected to some extent by the equipment used, but to a considerable extent is determined by the composition of the absorbing medium. In order to evaluate the composition of the absorbing medium in this respect, I, therefore, test the medium as follows:

In the test I employ a flask fitted with a sealed agitator, a thermometer reaching to the bottom of the flask, and a connection leading to an offside condenser, which condenser is strongly cooled. The lower end of the condenser dips into a smaller flask containing strong sulphuric acid, which is provided for receiving the condensate and for scrubbing the water vapor out of the evolved carbon dioxide gas. During the test, I place a sample of the sludge from the absorber in the agitated flask and apply heat both at the bottom (to cause gentle ebullition) and near the neck of the flask (to prevent condensation and reflux). By careful weighing of the two flasks, before and after heating, the weight of carbon dioxide and water vapor driven off from the absorber sludge may be determined.

In the process of my invention, the carbon dioxide is liberated very easily and with very little concomitant water vapor at the start of the desorption (boiling operations). As this proceeds, the temperature of the solution rises and a greater proportion of the water vapor is expelled with the carbon dioxide gas. It is, of course, within the province of the operator of my process to choose, depending upon various practical considerations, the temperature at which he desires to carry out the boiling off operations. This is illustrated by a series of tests I have made when boiling off an absorber sludge similar to that specified in Example 1.

| Final boiling temp. | Percent of $CO_2$ (expelled at 100° C.) expelled in test | Ratio of water to $CO_2$ evolved (by weight) |
|---|---|---|
| 80 [1] | 27 | 0.15 |
| 90 | 48 | 0.24 |
| 94 | 62 | 0.35 |
| 98 | 81 | 0.67 |
| 100 | 100 | 1.16 |

[1] All solids dissolved at 68° C.

When, as in the first example of the process, the boiling off operation is continued until the temperature of 100° C. is reached, there is secured one pound of carbon dioxide from the solution for each 1.2 pounds of water boiled off the solution. There is secured a yield of approximately 0.41 pound of carbon dioxide per gallon of sludge passed to the boiling off operation. By boiling slightly harder (say to 102° C.), the yield of carbon dioxide may be increased at the sacrifice of somewhat greater evolution of water from the solution. As much as 0.5 pound of carbon dioxide per gallon of sludge may be recovered. This represents a substantial advance over the usual practice of the art in which only about 0.1 pound of carbon dixide is boiled off a gallon of starting material.

Moreover, the process of the present invention attains a high yield of carbon dioxide per gallon of material with the evolution of only a relatively small amount of water vapor (low steam or heat consumption). In the usual practice of the art, the steam consumption per pound of carbon dioxide liberated is 5 to 10 times that of the present example of the process of my invention.

After liberation of the carbon dioxide in the boiling off operation, all solids are usually in solution. The hot solution is then cooled and returned to the carbonating or absorbing operation. During this cooling operation, over-saturation is reached with respect to potassium tetraborate tetrahydrate ($K_2B_4O_7.4H_2O$), and such potassium tetraborate may be precipitated in some cases. I have found, however, that $K_2B_4O_7 \cdot 4H_2O$ has a strong tendency to resist crystallization, so that the cooling procedure may not precipitate all, or even any, $K_2B_4O_7 \cdot 4H_2O$ during the cooling operation. This failure of $K_2B_4O_7 \cdot 4H_2O$ to precipitate is not disadvantageous. In fact, it is decidedly helpful. If a large quantity of the relatively basic $K_2B_4O_7 \cdot 4H_2O$ remains in the cold solution in a state of supersaturation, then the solution becomes even a better absorption medium for carbon dioxide from dilute gases.

In the absorbing or carbonating operations flue gases, or other sources of carbon dioxide admixed with other gases may be employed. Generally, the absorbing operations are conducted counter-current—the cold absorbing medium is introduced into the top of an absorption tower, while the gases are introduced into the bottom of the tower. During the absorbing operations, the potassium tetraborate reacts with carbon dioxide, forming potassium pentaborate. The potassium pentaborate precipitates from solution as octohydrate ($K_2B_{10}O_{16} \cdot 8H_2O$). Heat is liberated in these absorbing operations and may be continuously removed in the operations to maintain the absorbing medium at the desired temperature.

In the first example of my process, I employ a temperature of 35° C. during the absorption operations. It is obvious, however, that the economical consideration of each individual plant will determine the most suitable temperature of operation. As a result of this carbonation operation, the previously described starting sludge is produced. When the absorbing operations are conducted counter-currently, the most denuded gases come into contact with the fresh absorbing medium which is best adapted to remove the carbon dioxide therefrom. Where the fresh cold absorbing medium is supersaturated with $K_2B_4O_7 \cdot 4H_2O$ it has even a lower $CO_2$ partial pressure than the absorption medium which has precipitated $K_2B_4O_7 \cdot 4H_2O$, and is, therefore, more effective in absorbing carbon dioxide. Because of the high efficiency of the absorbing liquor when supersaturated with $K_2B_4O_7 \cdot 4H_2O$ to remove carbon dioxide, it may be fed into the tower at temperatures considerably higher than the temperature at which it is to be withdrawn from the tower. During the absorption or carbonation operation, the precipitation of the acid borate ($K_2B_{10}O_{16} \cdot 8H_2O$) restrains the rise of acidity in the absorption medium and thereby permits a high absorption of carbon dioxide per gallon of absorption medium used.

While I have referred to the acid borate precipitated during the carbonation operation as potassium pentaborate octohydrate $$(K_2B_{10}O_{16} \cdot 8H_2O)$$

I have occasionally encountered the formation and precipitation of other acid borates (more acid than $K_2B_4O_7$), about whose composition I know very little at this time. Potassium pentaborate ($K_2B_{10}O_{16} \cdot 8H_2O$) is the usual form precipitated, and is probably precipitated, at least in part, in all cases. Other acid borates sometimes, however, also precipitate. Such acid borates appear to be also quite insoluble at low carbonation temperatures and to readily dissolve at the higher boiling off temperatures. Such other acid borates, therefore, behave in the same manner as the potassium pentaborate material and are, therefore, included herein as within the scope of my invention.

In the second example of the process of my invention, I maintain a greater content of potassium borate material in the medium than described in connection with the first example. By so doing, I may obtain either a greater yield of carbon dioxide per gallon of the medium employed, or I may obtain the same yield with a low steam or heat consumption, or both. These advantages are attainable only by handling sludges of greater density.

In the second example of the process, I start the process by adding 92.4 parts by weight of $K_2B_4O_7 \cdot 4H_2O$ to 99.3 parts by weight of water. The resulting medium is then employed to absorb carbon dioxide from gases containing the same until all the solid $K_2B_4O_7 \cdot 4H_2O$ has been dissolved at 35° C., for example, and the solution has absorbed 10.6 parts by weight of carbon dioxide, i. e., contains 24.1 parts of "$KHCO_3$" ($CO_2$ expressed as $KHCO_3$). By so carbonating, a precipitate of 42.9 parts by weight of $K_2B_{10}O_{16} \cdot 8H_2O$ will be formed. This 42.9 parts by weight of $K_2B_{10}O_{16} \cdot 8H_2O$ may be compared with the 27.6 parts precipitated in the first example. The solution formed has exactly the same composition at 35° C. as the solution described in the first example. The fact that a greater quantity of acid borate is precipitated and is present in the sludge does not alter the partial pressure of carbon dioxide over the sludge; such partial pressure being the same as in the first example—namely, 64 mm. at 30° C. or 77 mm. at 35° C. This larger amount of acid borate in the sludge of the second example provides an even greater reservoir of acidity for use during the boiling off or desorption operations, with the result that either (1) the desorption may be carried out more easily and with less consumption of steam when the same yield (as in Example 1, i. e., 6.2 parts per 100 parts excess $H_2O$) of carbon dioxide is desired; or (2) a greater yield of $CO_2$ per gallon of sludge may be obtained while suffering the same steam consumption as in the former case.

If such greater yield is desired, it is obvious, of course, that the $KHCO_3$ content of the desorbed solution will have to be reduced to a lower value than in the former case—say to 5 parts of $KHCO_3$ per 100 parts of excess $H_2O$.

The following tabulation of "boiling off" data, similar to that explained in connection with the first example, shows the advantages just enumerated for Example 2:

| Final boiling temp. °C. | Percent of $CO_2$ (expelled at 100° C.) expelled in test | Ratio of water to $CO_2$ evolved (by weight) |
| --- | --- | --- |
| 75 [1] | 38 | 0.11 |
| 85 | 52 | 0.14 |
| 94 | 71 | 0.31 |
| 98 | 87 | 0.47 |
| 100 | 100 | 0.95 |

[1] All solids had dissolved at this temperature.

On a comparable basis (100 parts excess water in the absorber sludge), the boiling off operations liberated, 27% more $CO_2$ in Example 2 than in Example 1, and did so with a lesser evolution of water vapor (per pound of liberated $CO_2$). The indicated one pound of carbon dioxide per pound of water vapor during desorption represents an extremely economical operation—a great advance over past practice.

In the second example of the process, the desorbed medium is cooled and returned to the carbonating operation as in Example 1, thereby establishing the cycle.

In either example of my process, a great deal of the recovered $CO_2$ in the desorbing operations is derived by reaction of the precipitated acid borate with the potassium bicarbonate in the solution, as shown by the following equation:

$$2K_2B_{10}O_{16} + 6KHCO_3 + heat = 5K_2B_4O_7 + 6CO_2$$

Thus, in my process one mol of carbon dioxide is recovered for each mol of potassium bicarbonate ($KHCO_3$) entering into reaction with the potassium pentaborate. Under the usual practice, where bicarbonate is decomposed by heat, only one-half mol of carbon dioxide is liberated for each mol of bicarbonate so decomposed.

While I have described in both of the foregoing examples that the carbonating operations are conducted to produce a solution containing about 24 parts of $KHCO_3$ in the absorption solution per 100 parts of excess water, the carbonation could easily be carried to a lesser degree—say 18 to 20 parts, or the carbonation could go as high as saturation with $KHCO_3$—but in such case, only by operating with increased carbon dioxide partial pressures—that is, 96 mm. at 25° C., 148 mm. at 30° C., and 234 mm. at 35° C. Under certain economic considerations, such increased partial pressures would not be prohibitive. In fact, I recognize the possibility of conducting the absorption under elevated gas pressures, as well as at substantially atmospheric pressure.

In the foregoing two examples of my invention, the absorption medium has included only the potassium borate and carbonate compounds. However, the presence in the absorption medium of sodium compounds is not deleterious. Potassium tetraborate is not at present a cheap material of commerce. Potassium pentaborate $$(K_2B_{10}O_{16}.8H_2O)$$

is, on the other hand, a cheaper product than $K_2B_4O_7$ due to the ease of efficiency with which it may be prepared. By substituting considerable $K_2B_{10}O_{16}.8H_2O$ and a suitable alkaline compound, such as $Na_2CO_3$, for the relatively expensive $K_2B_4O_7.4H_2O$, a very useful absorption medium may be produced. In fact, this absorption medium has certain advantages over the absorption mediums described in Examples 1 and 2. The reaction between the alkaline sodium compound and the potassium pentaborate produces an appreciable quantity of borax in solution, and the presence of borax ($Na_2B_4O_7$) in solution may contribute various advantages.

To start the process, I produce an absorbing medium by adding to 110.6 parts by weight of water the following reagents:

| | Parts |
|---|---|
| $K_2B_4O_7.4H_2O$ | 71.4 |
| $K_2B_{10}O_{16}.8H_2O$ | 37.8 |
| $Na_2CO_3$ | 9.0 |

This absorption medium is then carbonated until all of the solid $K_2B_4O_7.4H_2O$ dissolves (requiring 6.7 parts $CO_2$ for this first preparation step). At this stage, the absorption medium contains the same amount (per 100 parts excess water) of solid $K_2B_{10}O_{16}.8H_2O$ as the second example set forth above—namely, 42.9 parts of solid $K_2B_{10}O_{16}.8H_2O$. The solution composition at 35° C. is:

| | |
|---|---|
| $K_2B_4O_7.4H_2O$ | 28.2 |
| $K_2B_{10}O_{16}.8H_2O$ | 7.9 |
| $KHCO_3$ | 24.0 |
| $Na_2B_4O_7.10H_2O$ | 32.5 |
| Excess $H_2O$ | 100.0 |

This solution exhibits a partial pressure of carbon dioxide at 33° C. of 44 mm.

The sludge may then be passed to the desorber. Boiling and liberation of carbon dioxide commences around 65° C. A tabulation of "boiling off" data, similar to that set forth in connection with Examples 1 and 2 is as follows:

| Final boiling temp., °C. | Percent of $CO_2$ (expelled at 100° C.) expelled in test | Ratio of water/$CO_2$ evolved (by weight) |
|---|---|---|
| 75 [1] | 23 | 0.11 |
| 85 | 39 | 0.15 |
| 94 | 61 | 0.34 |
| 98 | 83 | 0.60 |
| 100 | 100 | 1.04 |

[1] All solids in solution at 71° C.

In boiling off carbon dioxide in Example 3 all solids go into solution at about 71° C. If the boiling off operations are continued until a temperature of about 100° C. is reached, the actual quantity of carbon dioxide expelled (per 100 parts of excess water in the absorber sludge) is about the same as in the case of Example 2. At the completion of the desorbing operations, all solids are in solution. The solution may then be cooled and recycled to the absorption or carbonating operations.

The cooled solution exceeds saturation at 33° C. with respect to potassium tetraborate tetrahydrate, but such material may be retained in solution in a supersaturated state. When this is done, I find that the absorbing medium when cooled to 33° C. showed a very low partial pressure of carbon dioxide—namely, 17 mm.

In the foregoing examples of my invention, I have described operations in which the carbonation is conducted so that the final carbonated sludge will be just saturated with the tetraborate in question, but various modifications are possible in practice. Less $K_2B_4O_7.4H_2O$ may be added to the cycled liquors during make-up—or the carbonation may be carried further with respect to the quantity of $K_2B_4O_7.4H_2O$ actually added—resulting in a lower $K_2B_4O_7$ concentration in the carbonated liquor. Within reasonable limits, deficiency of saturation may be practised with the process of the present invention, so long as sufficient reagent is added to insure the absorption of carbon dioxide and the precipitation of an acid potassium borate, such as $K_2B_{10}O_{16}.8H_2O$. Furthermore, in the process of this invention, an even greater quantity of the reagent $K_2B_4O_7.4H_2O$ may be used than that necessary to produce the solution, which after carbonation is just saturated with $K_2B_4O_7.4H_2O$—allowing some solid $$K_2B_4O_7.4H_2O$$

to be present in the sludge leaving the carbonation, or allowing the carbonated solution to remain over-saturated with respect to $K_2B_4O_7.4H_2O$. One advantage of such an excess is that it eliminates the necessity for exact control of the extent of the carbonation operation.

I have mentioned the tendency of the desorber liquor to become supersaturated upon cooling with respect to the alkaline borates ($K_2B_4O_7.4H_2O$ and $Na_2B_4O_7.10H_2O$) and have indicated that such a phenomenon is not disadvantageous. I have also found that the acidic borate ($K_2B_{10}O_{16}.8H_2O$) may be sluggish in precipitating during carbonation. This is definitely undesirable and the operator should take steps to avoid the same. This can be accomplished by good agitation during carbonation, or by seeding with $K_2B_{10}O_{16}.8H_2O$, or by both methods. Usually, in a continuous process, once established, little trouble is encountered on this score.

Reference is hereby made to my copending applications Serial Number 507,298, filed October 22, 1943, and Serial Number 519,340, filed January 22, 1944, which claim related subject matter.

I claim:

1. A process of extracting carbon dioxide from gases containing the same, which process comprises absorbing carbon dioxide from such gases to form potassium bicarbonate by reaction with an absorbing medium containing such concentrations of potassium borates that pentaborate is formed by said reaction and potassium pentaborate octohydrate is precipitated to form a sludge, then heating the resulting sludge to such an extent that the potassium pentaborate octohydrate reacts with the dissolved potassium bicarbonate to form and expel carbon dioxide and to form tetraborate in solution, and cooling and returning the resultant absorbing medium to the first operation.

2. A process of extracting carbon dioxide from gases containing the same, which comprises absorbing carbon dioxide from such gases to form potassium bicarbonate by reaction with an absorbing medium containing such concentrations of potassium borates that pentaborate is formed and potassium pentaborate octohydrate is precipitated by such reaction, said absorbing medium being initially metastably supersaturated with potassium tetraborate tetrahydrate, then heating the resultant sludge to such an extent that the potassium pentaborate octohydrate reacts with the dissolved potassium bicarbonate to form and expel carbon dioxide and to form tetraborate in solution, and then cooling the resultant absorbing medium and returning the same to the first operation.

3. A process of extracting carbon dioxide from gases containing the same, which comprises absorbing carbon dioxide from such gases to form potassium bicarbonate by reaction with an absorbing medium containing such concentrations of sodium and potassium borates that pentaborate is formed and potassium pentaborate octohydrate is precipitated by the reaction, then heating the resulting sludge to such an extent that the potassium pentaborate octohydrate reacts with the dissolved potassium bicarbonate to form and expel the absorbed carbon dioxide and to form tetraborate in solution, and cooling and returning the absorbing medium to the first-mentioned operation.

4. A process of extracting carbon dioxide from gases containing the same, which process comprises absorbing carbon dioxide from such gases to form potassium bicarbonate by reaction with an absorbing medium containing such concentrations of potassium borate that pentaborate is formed and potassium pentaborate octohydrate is precipitated by such reaction, the absorbing medium being initially metastably supersaturated with potassium tetraborate tetrahydrate, the reaction being continued until the resulting sludge of potassium pentaborate octohydrate solution is near saturation but not metastably supersaturated with respect to potassium tetraborate tetrahydrate, heating the resulting sludge to such an extent that the pentaborate reacts with the dissolved potassium bicarbonate to form and expel the absorbed carbon dioxide and to form tetraborate in solution, and finally cooling and returning the absorbing medium to the first operation.

FRANK HENDERSON MAY.